United States Patent
Yamatsu

(10) Patent No.: US 7,436,749 B2
(45) Date of Patent: Oct. 14, 2008

(54) HOLOGRAM RECORDING AND REPRODUCTION APPARATUS

(75) Inventor: Hisayuki Yamatsu, Tokyo (JP)

(73) Assignee: Sony Corporation (JP)

( * ) Notice: Subject to any disclaimer, the term of this patent is extended or adjusted under 35 U.S.C. 154(b) by 532 days.

(21) Appl. No.: 10/998,643

(22) Filed: Nov. 30, 2004

(65) Prior Publication Data
US 2005/0141388 A1 Jun. 30, 2005

(30) Foreign Application Priority Data
Dec. 3, 2003 (JP) ............... P2003-404790

(51) Int. Cl.
*G11B 7/00* (2006.01)
(52) U.S. Cl. .................................... 369/103
(58) Field of Classification Search ............... None
See application file for complete search history.

(56) References Cited

U.S. PATENT DOCUMENTS

| | | | | |
|---|---|---|---|---|
| 4,104,489 | A * | 8/1978 | Satoh et al. ........... | 369/103 |
| 4,225,211 | A | 9/1980 | Abe | |
| 5,339,305 | A * | 8/1994 | Curtis et al. ........... | 369/103 |
| 5,627,664 | A | 5/1997 | Trisnadi | |
| 5,995,251 | A * | 11/1999 | Hesselink et al. ...... | 359/30 |
| 6,272,095 | B1 * | 8/2001 | Liu et al. .............. | 369/103 |
| 7,085,217 | B2 * | 8/2006 | Horimai et al. ......... | 369/103 |

FOREIGN PATENT DOCUMENTS

| | | |
|---|---|---|
| CN | 1447315 A1 | 10/2003 |
| JP | 10123920 A1 | 5/1998 |
| JP | 10214431 A1 | 8/1998 |
| JP | 11024540 A1 | 1/1999 |
| JP | 2000-089648 | 3/2000 |
| WO | WO 02/48800 A1 | 6/2002 |

OTHER PUBLICATIONS

Australian Patent Office Search Report/Written Opinion, Application No. SG 200407054-6, dated Jun. 8, 2005.

\* cited by examiner

*Primary Examiner*—Joseph Feild
*Assistant Examiner*—Peter Vincent Agustin
(74) *Attorney, Agent, or Firm*—Rader Fishman & Grauer PLLC; Ronald P. Kananen

(57) ABSTRACT

A hologram recording and reproduction apparatus is disclosed which can raise the degree of freedom in design to achieve miniaturization thereof and can raise the hologram recording density of the shift multiplexing type. Upon recording, recording light specially optically modulated by a spatial optical modulator and reference light having a wave front disturbed at random by a randomizing phase mask are coupled so as to have a common optical axis and introduced to a recording area of a hologram recording medium. As a result, the number of lenses to be moved so as to follow up the variation of the position of a recording area or a reproduction area can be reduced. Further, the random disturbance of the wave front of the reference light makes the shift selectivity sharp in both of the along-track direction and the cross-track direction.

1 Claim, 5 Drawing Sheets

HOLOGRAM RECORDING AND REPRODUCTION APPARATUS

BACKGROUND OF THE INVENTION

This invention relates to a hologram recording and reproduction apparatus which records and reproduces a hologram in accordance with a shift multiplexing method, and more particularly to reduction in size and improvement in recording density of a hologram recording and reproduction apparatus of the type mentioned.

In the field of hologram memories which can achieve a large recording capacity by recording information three-dimensionally on a recording medium, various recording and reproduction methods such as angle multiplexing, shift multiplexing, wavelength multiplexing and phase modulation multiplexing have been heretofore proposed. Above all, it is preferable to adopt the shift multiplexing recording method for recording and reproduction of a hologram for which a rotational medium represented by a disk is used.

A conventional recording and reproduction apparatus which performs the shift multiplexing hologram recording has such a general configuration as shown in FIG. 5. Referring to FIG. 5, in order to record data on a hologram recording medium 12, a data page to be recorded is displayed on a spatial optical modulator (liquid crystal display apparatus of the light transmission type) 8 while a shutter 3 remains closed. Then, a spindle motor 24 is rotated to determine a recording place (recording area) of the hologram recording medium 12, and then the shutter 3 is opened.

Consequently, a coherent laser beam emitted from a laser light source 2 passes through the shutter 3 and enters a beam splitter 4, by which it is split into recording light 100 and reference light 200. The recording light 100 is introduced to the spatial optical modulator 8 by a mirror 6. When the recording light 100 passes through the spatial optical modulator 8 on which the data page is displayed, it is spatially optically modulated (amplitude modulated) by the spatial optical modulator 8. The modulated recording light is condensed on a recording area of the hologram recording medium 12 by a recording light lens (optical lens) 10.

Meanwhile, the reference light 200 is reflected to change its advancing direction by a mirror 14 and is then illuminated by a lens 18 so that it intersects in a fixed angle with the recording light 100 to generate interference fringes within the hologram recording medium 12. The data page (hologram) described above is recorded as a refractive index distribution according to a spatial distribution of the interference fringes.

After one hologram is recorded, the hologram recording medium 12 is moved by a fixed distance relative to the optical system, and then a next hologram is recorded. In the arrangement of FIG. 5, every time one hologram is recorded on the recording medium 12, the disk type hologram medium 12 is rotated by a fixed angle by the spindle motor 24. Then, after the hologram recording medium 12 makes one rotation, the optical system or the hologram recording medium 12 is moved in a radial direction of the hologram recording medium 12, and the recording in a circumferential direction of the medium is performed again. The sequence of operations described is repeated to record a large number of holograms over an overall area of the hologram recording medium 12.

In order to reproduce a hologram recorded in such a manner as described above, reference light (same as reproduction illumination light) of the same wave front is illuminated from the same position as that upon recording of the hologram on the hologram recording medium 12. Consequently, diffracted light corresponding to interference fringes recorded on a recording track of the hologram recording medium 12 is generated and is condensed by a lens 20 on and received by an image pickup element in a detector 22. Then, a resulting signal from the image pickup element is analyzed to restore the original image data (data page).

It has been proposed, for example, in Japanese Patent Laid-Open No. 2000-89648 that, where the hologram recording medium 12 is sufficiently thick when compared with the wavelength used for the recording, even if different holograms partially overlap with each other spatially, only a target hologram is reproduced if the shift amount between the holograms is greater than a fixed value. The fixed value of the shift amount relies upon the intersecting angle between the reference light 200 and the recording light 100, the f values of the individual lenses, the thickness of the hologram recording medium 12 and so forth. However, it is possible to realize, with regard to the along-track direction, a value of approximately several µm to several tens µm. It is to be noted that, where a spherical wave is used as the reference light, anisotropy appears and the shift selectivity in the cross-track direction becomes approximately 1 mm.

However, where cases of an optical disk recording and reproduction apparatus which are commercially established in the conventional field of optical memories are considered, one of significant factors in apparatus miniaturization is miniaturization of an optical pickup. Meanwhile, in a hologram recording and reproduction apparatus of the shift multiplexing type, such elements as the lenses 18, 10 and 20 for reference light, recording light and reproduction light act similarly to the optical pickup of the optical disk recording and reproduction apparatus. Each of the lenses 18, 10 and 20 must be moved so as to follow up the information recording or reproduction position of the hologram recording medium 12. As the number of lenses to be moved is great, actuators for moving the lenses are obliged to be complicated and have increased sizes and servo systems are complicated, which decreases the degree of freedom in design. This makes it less easy to design a miniaturized apparatus. Thus, it is difficult to miniaturize a hologram recording and reproduction apparatus of the shift multiplexing type equivalently to existing optical disk recording and reproduction apparatus.

Further, the shift multiplexing is a method wherein the recording place of the hologram recording medium is successively moved in parallel little by little to perform multiplexed recording. However, since a spherical wave is used as the reference light, the recording density can be raised only in one direction due to the anisotropy. In particular, in the case of a disk type recording medium, while the shift selectivity of 10 µm can be taken in the along-track direction to achieve a high density, the shift selectivity in the cross-track direction is approximately 1 mm. Thus, there is a characteristic that the recording track pitch is great and the recording density cannot be raised.

SUMMARY OF THE INVENTION

It is an object of the present invention to provide a hologram recording and reproduction apparatus which can raise the degree of freedom in design to achieve miniaturization thereof and can raise the hologram recording density of the shift multiplexing type.

In accordance with the present invention, the object described above is achieved by configuring a hologram recording and reproduction apparatus generally such that, upon recording, a spatially optically modulated first light beam (recording light) and a second light beam (reference light) having a wave front disturbed at random are coupled so as to have a common optical axis and introduced to a recording area of a hologram recording medium whereas, upon reproduction, diffracted light which is generated by illuminating reproduction reference light solely on the hologram recording medium is reflected by a reflecting member formed on the hologram recording medium so as to return in the incoming direction of the reference light.

In particular, according to a first aspect of the present invention, there is provided a hologram recording and reproduction apparatus for recording interference fringes produced by interference of a spatially optically modulated first light beam and a second light beam in a recording area of a hologram recording medium, including a randomizing phase member for disturbing a wave front of the second light beam at random, and an optical axis coupling optical system for coupling the spatially optically modulated first light beam and the second light beam having the randomly disturbed wave front so as to have a common optical axis and propagate in the same direction.

In the hologram recording and reproduction apparatus, a spatially optically modulated first light beam (recording light) and a second light beam (reference light) having a wave front disturbed at random are coupled so as to have a common optical axis thereby to produce interference fringes of the two light beams. Then, the interference fringes are recorded in a recording area of a hologram recording medium. Consequently, the recording light and the reference light which have a common optical axis can be introduced to the recording area by means of a common lens. Therefore, the number of lenses which must be moved so as to follow up the variation of the position of the recording area can be reduced, upon recording, to at least one. Consequently, an actuator for moving the lens can be simplified and miniaturized, and the degree of freedom in design increases and designing of an apparatus for miniaturization can be performed readily. Further, since the wave front of the reference light is disturbed at random by the randomizing phase member, incoincidence in wave front between the original reference light and the reference light after moved can be obtained from movement by a very small distance. Consequently, a sharp shift selectivity can be assured in both of the along-track direction and the cross-track direction. Therefore, the shift amount of the hologram recording medium can be reduced and the recording density of the hologram recording medium can be enhanced significantly. Further, where the hologram recording and reproduction apparatus further includes an optical lens for causing the second light beam (reference light) having the randomly disturbed wave front and the spatially optically modulated first light beam (recording light) to be condensed in different condensation states from each other at the position of the hologram recording medium, it is possible to cause, for example, the reproduction reference light to diverge at an image pickup device so as to decrease the amount of the reference light illuminated on the hologram recording medium upon reproduction which light is mixed into the diffracted light and introduced to the image pickup device. Consequently, the S/N ratio of the reproduction signal can be improved. Further, where the hologram recording and reproduction apparatus further includes a light beam removing device for removing the second light beam (reproduction reference light) from the diffracted light, since the reproduction reference light to be illuminated upon the hologram recording medium upon reproduction is removed positively so as not to mix into the diffracted light, the S/N ratio of the reproduction signal can be further improved.

According to another aspect of the present invention, there is provided a hologram recording and reproduction apparatus for recording interference fringes produced by interference of a spatially optically modulated first light beam and a second light beam in a recording area of a hologram recording medium, including the hologram recording medium having a reflecting member formed on a face opposite to a face thereof, to which the first and second light beams come in, for reflecting light, a randomizing phase member for disturbing a wave front of the second light beam at random, an optical axis coupling optical system for coupling the spatially optically modulated first light beam and the second light beam having the randomly disturbed wave front so as to have a common optical axis and propagate in the same direction, a first optical lens for condensing the first light beam having the optical axis common to the optical axis of the second light beam on a recording area of the hologram recording medium, and an image pickup device on which reflected light from the reflecting member of the program recording medium originating from diffracted light, which is generated by the hologram recording medium when the second light beam having the optical axis common to the optical axis of the first light beam is illuminated solely on the hologram recording medium through the first optical lens, is condensed through the first optical lens.

In the hologram recording and reproduction apparatus, a spatially optically modulated first light beam (recording light) and a second light beam (reference light) having a wave front disturbed at random are coupled so as to have a common optical axis thereby to produce interference fringes of the two light beams. Then, the interference fringes are recorded in a recording area of a hologram recording medium. Consequently, the recording light and the reference light which have a common optical axis can be introduced to the recording area by means of the common lens. Therefore, the number of lenses which must be moved so as to follow up the variation of the position of the recording area and the reproduction area of the hologram recording medium can be reduced. Further, since diffracted light, which is generated by the hologram recording medium when the reference light having the optical axis common to the optical axis of the recording light is illuminated solely on the hologram recording medium through the common lens, is reflected so as to return along the incoming direction of the reference light by means of the reflecting member formed on the program recording medium, the diffracted light can be condensed on the image pickup device through the common lens. Consequently, it is only necessary to cause at least one lens to move so as to follow up the variation of the position of the recording area and the reproduction area of the hologram recording medium. Therefore, the number of lenses which must be moved so as to follow up the variation of the position of the recording area and the reproduction area can be reduced significantly. Consequently, actuators for moving the lenses can be simplified and miniaturized, and the degree of freedom in design increases and designing of an apparatus for miniaturization can be performed more readily. Further, since the wave front of the reference light is disturbed at random by the randomizing phase member, in coincidence in wave front between the original reference light and the reference light after movement can be obtained from movement by a very small distance. Consequently, a sharp shift selectivity can be assured in both of the along-track direction and the cross-track direction. Therefore, the shift amount of the hologram recording medium can be reduced in regard to both of the along-track direction and the cross-track direction and the recording density of the hologram recording medium can be enhanced significantly. Further, where the hologram recording and reproduction apparatus further includes a second optical lens for causing the second light beam (reference light) having the randomly disturbed wave front and the spatially optically modulated first light beam (recording light) to be condensed in different condensation states from each other at the position of the hologram recording medium, it is possible to cause, for example, reproduction reference light same as the reproduction reference light to diverge at the image pickup device. Consequently, deterioration of the S/N ratio of the reproduction signal caused by the reproduction reference light mixing into the diffracted light can be prevented, and a reproduction signal having a good S/N ratio can be obtained.

In summary, with both of the hologram recording and reproduction apparatus, since a spatially optically modulated first light beam (recording light) and a second light beam (reference light) having a wave front disturbed at random are coupled so as to have a common optical axis and introduced to a recording area of a hologram recording medium, the number of lenses which must be moved so as to follow up the variation of the position of the recording area can be reduced to increase the degree of freedom in design, and consequently, designing of an apparatus for miniaturization is facilitated and the hologram recording and reproduction apparatus can be miniaturized.

Further, since diffracted light, which is generated by the hologram recording medium when reproduction reference light same as the reference light used upon recording is illuminated, upon reproduction, solely on the hologram recording medium, is reflected so as to return along the incoming direction of the reference light by means of the reflecting member formed on the program recording medium, the diffracted light can be condensed on the image pickup device using the lens provided for introducing the recording light and the reference light having a common optical axis to the recording area of the hologram recording medium. Therefore, the number of lenses which must be moved so as to follow up the variation of the position of the recording area and the reproduction area of the hologram recording medium can be reduced to at least one, and the number of lenses which must be moved so as to follow up the variation of the position of the recording area and the reproduction area of the hologram recording medium upon recording and upon reproduction can be reduced significantly. Consequently, designing of an apparatus for miniaturization is facilitated and miniaturization of the hologram recording and reproduction apparatus can be further promoted.

Furthermore, since the wave front of the reference light with which the reference light is to interfere is disturbed at random, a sharp shift selectivity can be assured in both of the along-track direction and the cross-track direction and the recording density of the hologram recording medium according to the shift multiplexing system can be enhanced significantly.

Further, where the hologram recording and reproduction apparatus further includes an optical lens for causing the reference light having the randomly disturbed wave front and the spatially optically modulated recording light to be condensed in different condensation states from each other at the position of the hologram recording medium, it is possible to cause, for example, reproduction reference light same as the reference light to diverge at the image pickup device. Consequently, deterioration of the S/N ratio of the reproduction signal caused by the reproduction reference light mixing into the diffracted light can be prevented. Further, where the hologram recording and reproduction apparatus further includes a device for positively removing the reproduction reference light so that the reproduction reference light may not mix into the diffracted light, the S/N ratio of the reproduction signal can be further improved.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Embodiment 1

Figure 1:
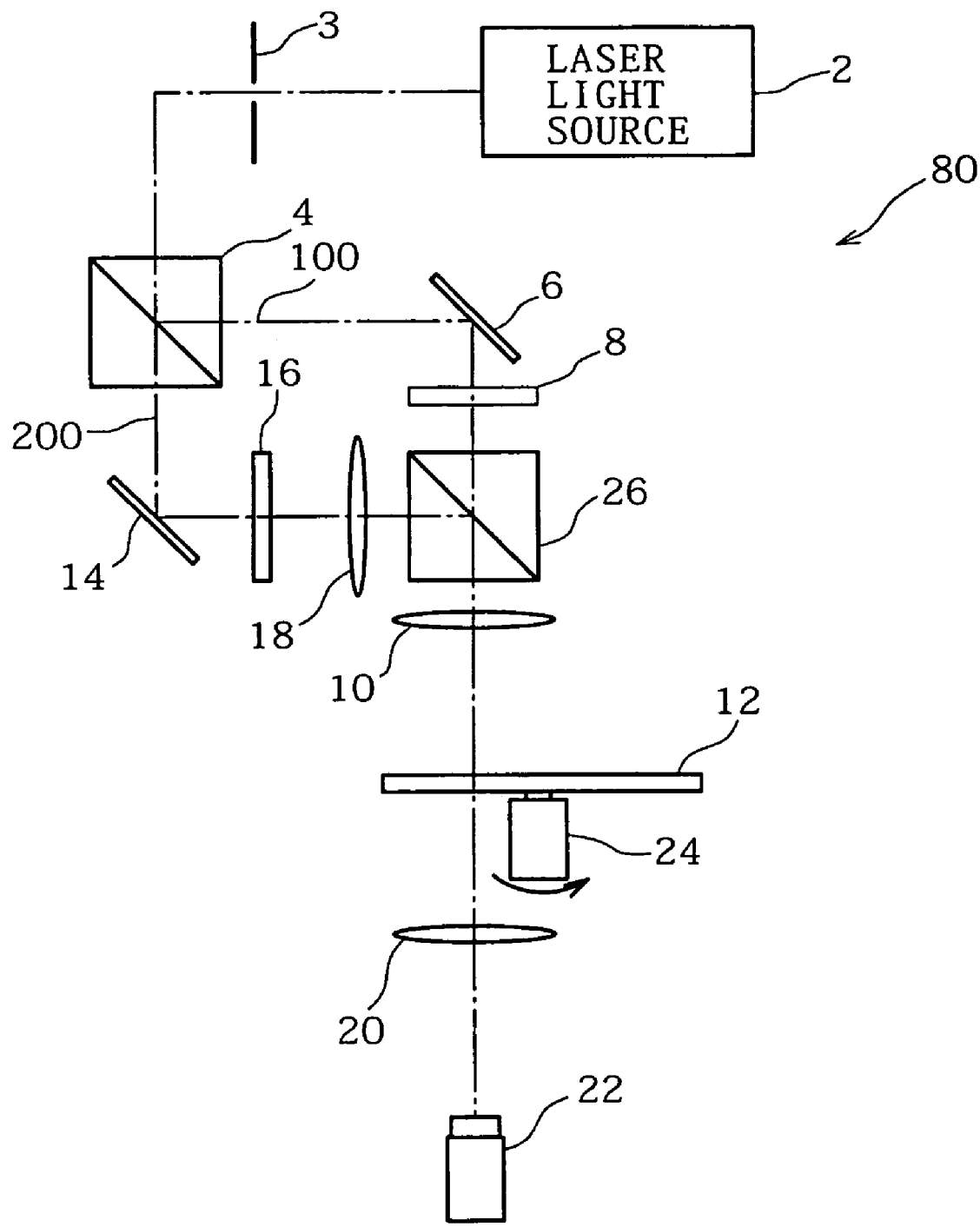
FIG. 1 is a schematic view showing a configuration of a hologram recording and reproduction apparatus according to a first embodiment of the present invention.

Referring to FIG. 1, there is shown a configuration of a hologram recording and reproduction apparatus according to a first embodiment of the present invention. The hologram recording and reproduction apparatus 80 shown includes a laser light source 2, a shutter 3, a beam splitter 4, a mirror 6, a spatial optical modulator 8, another beam splitter 26, and a lens 10. The hologram recording and reproduction apparatus 80 further includes a hologram recording medium 12 in the form of a disk made of a photopolymer material or the like. The hologram recording and reproduction apparatus 80 further includes another mirror 14, a randomizing phase mask 16 for disturbing a wave front of a laser beam at random, another lens 18, a further lens 20, a detector 22 which may be a CCD image sensor or a CMOS image sensor, and a spindle motor 24.

Different from the conventional hologram recording and reproduction apparatus, in the hologram recording and reproduction apparatus 80 of the present embodiment, the randomizing phase mask 16 is interposed on a light path of reference light 200. The randomizing phase mask 16 is preferably formed from a glass plate having a large number of irregular ups and downs on the surface thereof like, for example, a ground glass plate. The randomizing phase mask 16 of the type described can be produced by patterning of the surface of a glass plate by a combination of lithography and etching, and a large number of articles can be produced by the method.

The positions of the randomizing phase mask 16 and the lens 18 may be any positions between the beam splitter 4 and the beam splitter 26 only if the randomizing phase mask 16 is positioned nearer to the beam splitter 4 while the lens 18 is positioned nearer to the beam splitter 26. In this instance, however, the distance between the beam splitter 4 and the lens 18 and the distance between the lens 18 and the hologram recording medium 12 must satisfy such conditions that the condensed states of the reference light 200 and recording light 100 are different from each other at the hologram recording medium 12 and that the reference light 200, for example, diverges at the detector 22.

Meanwhile, the laser light source 2 may be any laser only if it generates a laser beam having a coherence length of several cm or more with which hologram recording is possible. However, the wavelength of the laser beam preferably is within the visible wavelength range within which a hologram recording medium 12 usually has a sensitivity, particularly within a range of approximately 400 nm to 650 nm.

Now, operation of the hologram recording and reproduction apparatus 80 is described. Referring to FIG. 1, in order to record data on the hologram recording medium 12, while the shutter 3 remains closed, a data page to be recorded is displayed on the spatial optical modulator 8 (liquid crystal display apparatus of the transmission type) and the spindle motor 24 is rotated to determine a recording place (recording area) of the hologram recording medium 12. Thereafter, the shutter 3 is opened.

Consequently, a coherent laser beam emitted from the laser light source 2 passes through the shutter 3 and enters the beam splitter 4, by which it is split into recording light 100 and reference light 200. The recording light 100 is reflected by the mirror 6 so that it is introduced into the spatial optical modulator 8. When the recording light 100 passes through the spatial optical modulator 8 on which the data page is displayed, it is spatially optically modulated (amplitude modulated). The modulated recording light is introduced into the beam splitter 26.

Meanwhile, the reference light 200 is introduced by the mirror 14 to the randomizing phase mask 16, by which the wave front of the reference light 200 is disturbed or disordered at random (randomized). The reference light 200 thereafter passes through the lens 18 and introduced into the beam splitter 26. The spatially optically modulated recording light 100 and the reference light 200 whose wave front is disturbed at random are combined by the beam splitter 26 and enters the lens 10.

Here, the image to be recorded as a hologram may be a real image displayed on the spatial optical modulator 8 by the lens 10 or a Fourier transformed image of the real image of the spatial optical modulator 8. However, the method of recording a Fourier transformed image is popularly employed because the size per one hologram can be made comparatively small readily and the image is less likely to be influenced by a defect appearing on the hologram recording medium 12.

By locating both of the spatial optical modulator 8 and the hologram recording medium 12 at places spaced by the focal length f of the lens 10 from the principal plane of the lens 10, a Fourier transformed hologram can be recorded in the hologram recording medium 12. Here, since the reference light 200 enters the lens 10 through the lens 18 in a different condensed state from that of the recording light 100, it is condensed at a different position from the recording light condensed position in the hologram recording medium 12. Thereafter, the shutter 3 is closed.

Then, a data page to be recorded next is displayed on the spatial optical modulator 8, and the spindle motor 24 is rotated a little to move the hologram recording medium 12 by δ. Thereupon, the portion of the hologram recording medium 12 at which the recording light 100 and the reference light 200 are to be condensed relatively moves by δ. When the shutter 3 is opened in this state, the data page to be recorded next is recorded as a hologram in the condensed region (recording area) of the recording light 100 and the reference light 200 in the hologram recording medium 12.

If it is assumed that the randomizing phase mask 16 does not exist in the light path of the reference light 200, then the reference light 200 is illuminated as a mere spherical wave in a state wherein it shares an optical axis commonly with the recording light 100 in the hologram recording medium 12. In this instance, since the spatial variation of the reference light wave front is moderate, it is necessary to take a very great distance over which the reference light wave front is to be moved spatially in order to record a next hologram after a data page (hologram) is recorded (the shift selectivity is slow). Therefore, overlapping writing of holograms really becomes impossible, and the recording density is very low.

However, where the phase of the reference light 200 is spatially modulated at random by the randomizing phase mask 16 as in the present embodiment, the reference light wave front becomes much complicated, and consequently, only if the reference light is shifted a little, incoincidence occurs with the wave front between the reference light before the movement and the reference light after the movement. Therefore, the shift selectivity becomes as sharp as approximately several μm in all directions within the surface of the hologram recording medium 12. Consequently, overlapping writing of holograms is allowed, and the recording density can be raised significantly.

Now, operation of the hologram recording and reproduction apparatus when it reproduces data from the hologram recording medium 12 on which data pages are recorded in such a manner as described above is described. First, a shutter not shown interposed between the beam splitter 4 and the mirror 6 is closed, and reference light (reproduction reference light) same as the reference light 200 used upon recording is illuminated on a recording track of the hologram recording medium 12 through the beam splitter 4, mirror 14, randomizing phase mask 16, lens 18, beam splitter 26 and lens 10. Consequently, diffracted light corresponding to interference fringes recorded on the recording track of the hologram recording medium 12 is generated. The diffracted light (reproduction light) is condensed by the lens 20 and received by the image pickup element in the detector 22. A resulting signal from the image pickup element is analyzed to restore the original image data (data page).

Where reproduction reference light same as the reference light 200 and having the same wave front is illuminated from the same position as that upon recording of the hologram on the hologram recording medium 12 in this manner, even if the reproduction reference light is illuminated inevitably on a hologram different from a target hologram, since the wave fronts of the reference lights used for recording of the holograms do not coincide with each other, the signal from the hologram other than the target hologram is not reproduced. An image of the reproduced hologram is formed on the detector 22 by the lens 20 as described above where the hologram recording medium 12 does not have a reflecting film thereon.

Where a hologram recorded on the hologram recording medium 12 otherwise is a real image of the spatial optical modulator 8, the lens 20 is disposed otherwise such that an image of the hologram is formed on the detector 22. However, where the hologram recorded is a Fourier image of the spatial optical modulator 8, the hologram recording medium 12 and the detector 22 are placed at positions spaced by the focal length f of the lens 20 from the lens 20. In this instance, not only the reproduction light but also the reproduction reference light illuminated on the hologram recording medium 12 enter the detector 22. However, if the focal length and the location of the lens 18 are selected suitably, then it is possible to cause the reproduction reference light to diverge by a great amount on the detector 22. Accordingly, the intensity of the reference light to enter the detector 22 can be reduced significantly when compared with the intensity of the reproduction light, and consequently, a signal to noise (S/N) ratio sufficient for reproduction of the recorded signal can be obtained.

With the hologram recording and reproduction apparatus 80 according to the present embodiment, since it adopts the configuration that the recording light 100 and the reference light 200 having a common optical axis are illuminated on the hologram recording medium 12 using the same lens 10, it is necessary only for the lens 10 and the lens 20 to be moved by actuators not shown so as to follow up the variation of the position of the recording area and the reproduction area of the hologram recording medium 12. Consequently, the number of lenses can be reduced by one from that in the conventional hologram recording and reproduction apparatus. Therefore, the actuators can be simplified and miniaturized, and the degree of freedom in design increases and designing for miniaturization of the apparatus can be performed readily. Further, since a servo system including the actuators can be simplified, the production cost therefor can be reduced and the apparatus can be produced at a reduced cost.

Further, since the wave front of the reference light 200 is disturbed at random by the randomizing phase mask 16, a sharp shift selectivity can be assured in both directions of the along-track direction and the cross-track direction. Therefore, the shift amount of the hologram recording medium 12 can be reduced thereby to raise the recording density of the hologram recording medium 12 significantly.

Further, since the optical axes of the recording light 100 and the reference light 200 are made coincide with each other, although reproduction reference light upon reproduction enters the detector 22 together with reproduction light, since the reproduction reference light is caused to diverge by a great extent on the detector 22 by the lens 18, a reproduction signal having a good S/N ratio can be obtained.

Figure 2A:
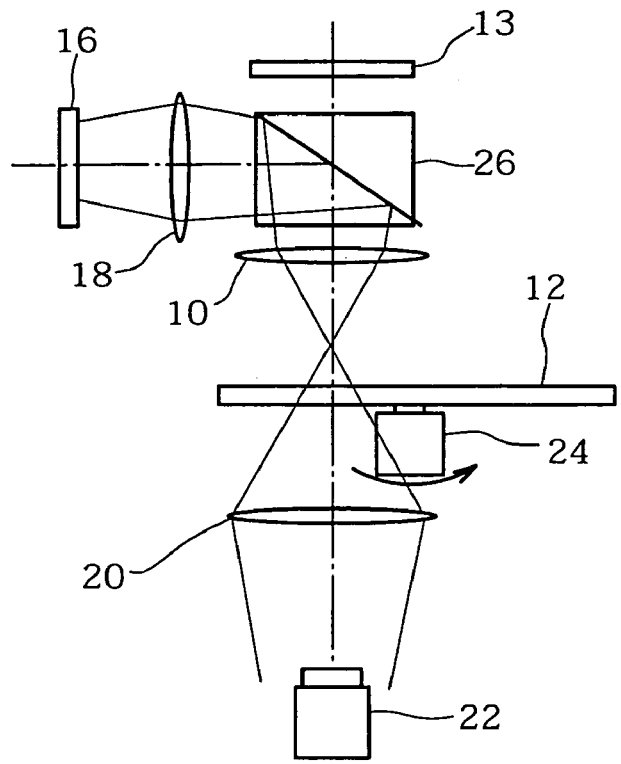
FIGS. 2A and 2B are schematic views illustrating a function of a lens shown in FIG. 1.
Figure 2B:
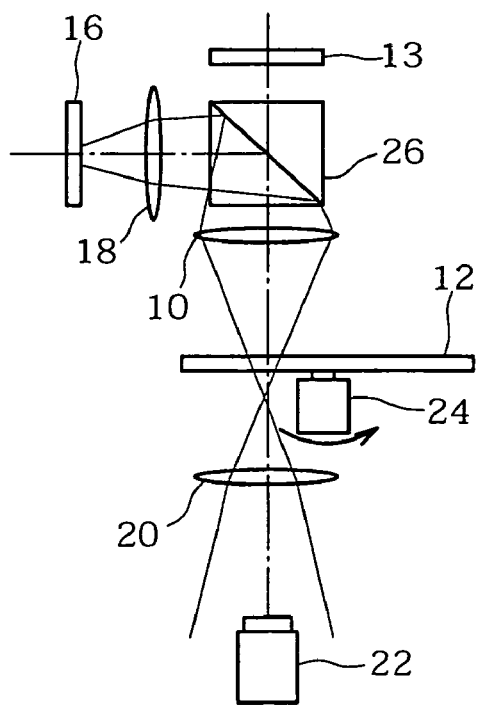

It is to be noted that, although, in the embodiment described above, only the reproduction light is condensed on the detector 22 while the reproduction reference light diverges, the reproduction reference light need not necessarily be diverged, but only it is necessary for the intensity of the reproduction reference light incoming to the detector 22 to be sufficiently low when compared with that of the reproduction light because of displacement between the condensation points of the reproduction light and the reproduction reference light. Such displacement between the condensation points is performed by a function of the lens 18. In particular, for the displacement, the lens 18 is disposed such that the reference light 200 (also the reproduction reference light) is condensed on the front side with respect to the hologram recording medium 12 as seen in FIG. 2A or otherwise on the rear side with respect to the hologram recording medium 12 as seen in FIG. 2B so that the condensation state of the reference light 200 may be different from that of the recording light 100 which is condensed without fail in the recording area of the hologram recording medium 12.

Embodiment 2

Figure 3:
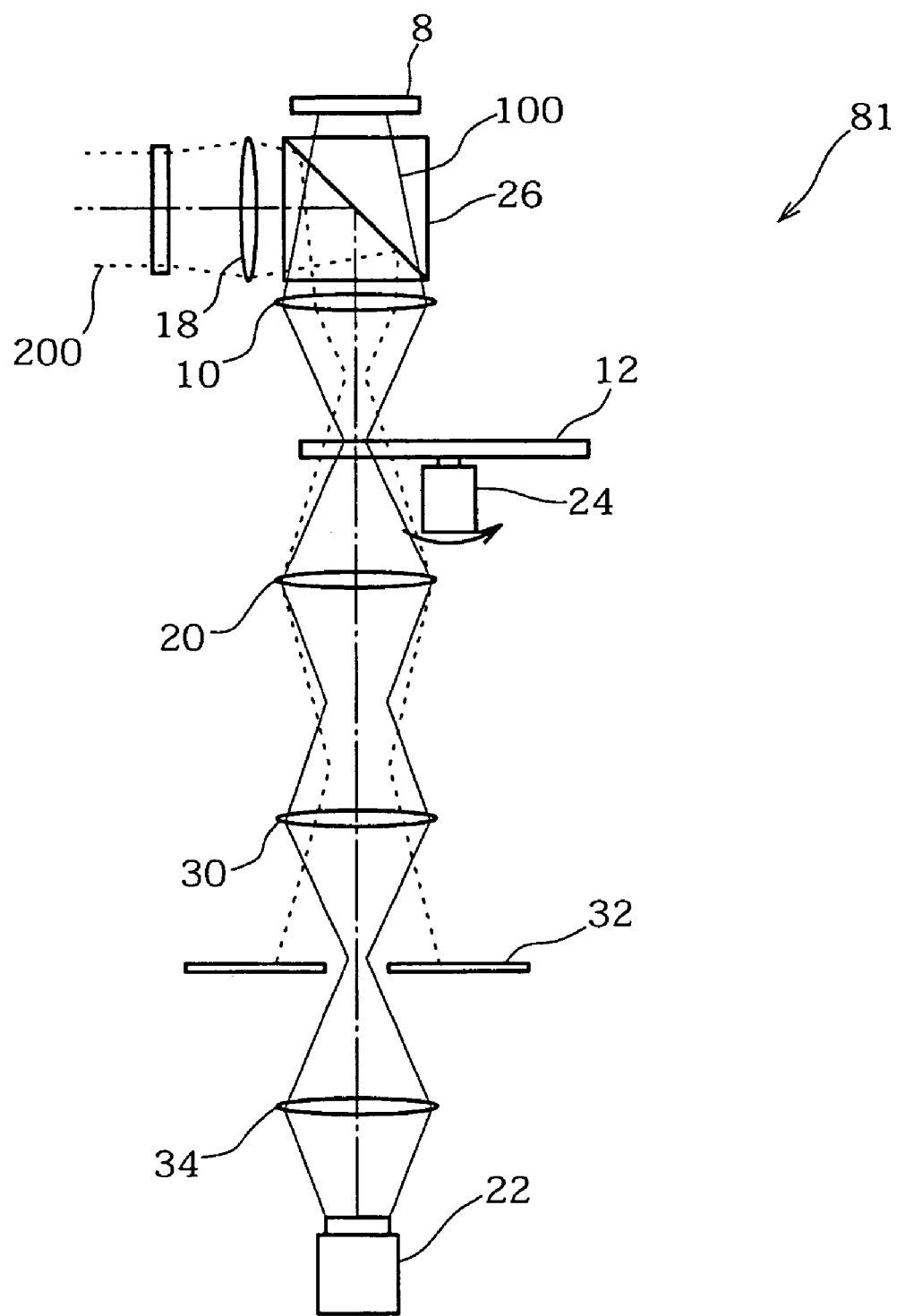
FIG. 3 is a schematic view showing a configuration of a hologram recording and reproduction apparatus according to a second embodiment of the present invention.

FIG. 3 shows a configuration of a hologram recording and reproduction apparatus according to a second embodiment of the present invention. Referring to FIG. 3, the hologram recording and reproduction apparatus 81 of the present embodiment includes a spatial optical modulator 8, a beam splitter 26, a lens 10, a hologram recording medium 12, another lens 20, a further lens 30, an aperture member 32 having an aperture therein, a still further lens 34, a detector 22 and a yet further lens 18. The lenses 20 and 30, aperture member 32 and lens 34 are disposed along an optical axis of reproduction light on the lower side of the hologram recording medium 12, and the detector 22 is disposed at the lowermost stage.

The lenses 10, 20, 30 and 34 have an equal focal length f and are spaced away from each other by 2f. Further, the spatial optical modulator 8 and the lens 10, the detector 22 and the lens 34, the hologram recording medium 12 and the lens 10, and the aperture member 32 and the lens 34 are spaced away from each other by f. Upon reproduction in this instance, the condensation position of the reproduction reference light by the lens 20 is farther from the lens 20 than the condensation position of the reference light by the lens 20. As a result, the reproduction reference light is diverges by the lens 30. Accordingly, if a suitable aperture member 32 is inserted at a position in the proximity of the condensation position of the reproduction light by the lens 30, then although the reproduction light passes through the aperture member 32, since the reproduction reference light diverges at the aperture member 32, most part of the reproduction reference light can be intercepted by the aperture member 32.

In the hologram recording and reproduction apparatus of the present embodiment, reproduction light generated by the hologram recording medium 12 forms, after it passes through the aperture member 32, an image on the detector 22 finally by means of the lens 34. Meanwhile, reproduction reference light diverges at the aperture member 32, and consequently, the reproduction reference light can be removed almost completely by the aperture member 32. Therefore, the S/N ratio of the reproduction signal obtained from the detector 22 can be further improved. Further, although part of the reproduction reference signal having passed through the aperture member 32 mixes into the reproduction light which forms an image on the detector 22, since the intensity of the reproduction reference light is very low when compared with that of the reproduction light and besides the reproduction reference light has a fixed spatial modulation pattern, it is easy to remove only the spatial modulation pattern of the reproduction reference light from the overall signal incoming to the detector 22 through an electric signal. Consequently, the S/N ratio of the reproduction signal can be further improved.

While the foregoing description relates to a case of a Fourier transform hologram where the condensation position of the reference light 200 by the lens 10 is on the nearer side of the lens 10 than the condensation position of the recording light 100, also where the condensation position of the reference light 200 by the lens 10 is on the farther side of the lens 10 than the condensation position of the recording light 100 or the holograms are real images of the spatial optical modulator 8, most part of reproduction reference light can be intercepted by inserting an aperture member at a suitable position in the light path similarly as described above.

Embodiment 3

Figure 4:
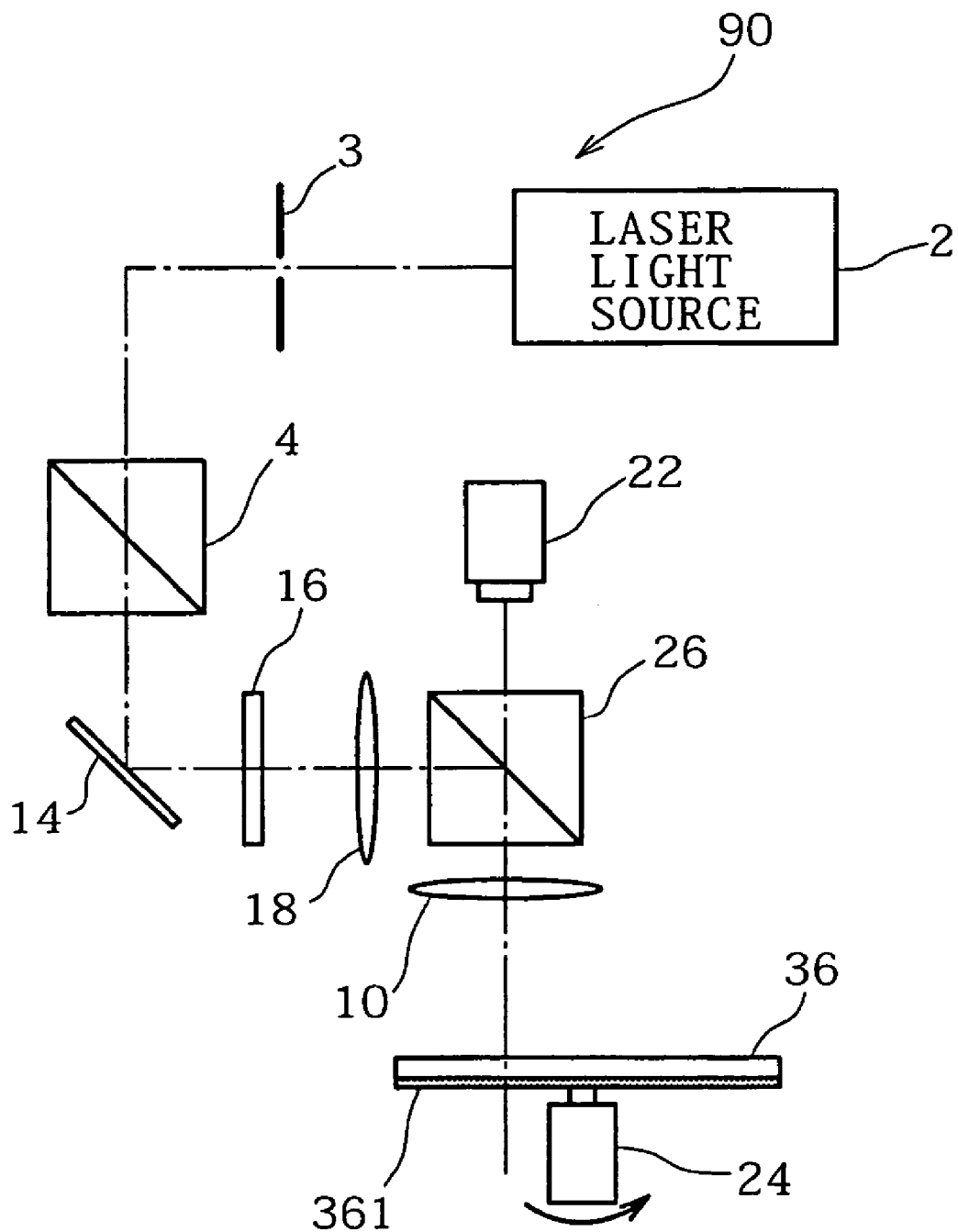
FIG. 4 is a schematic view showing a configuration of a hologram recording and reproduction apparatus according to a third embodiment of the present invention.
Figure 5:
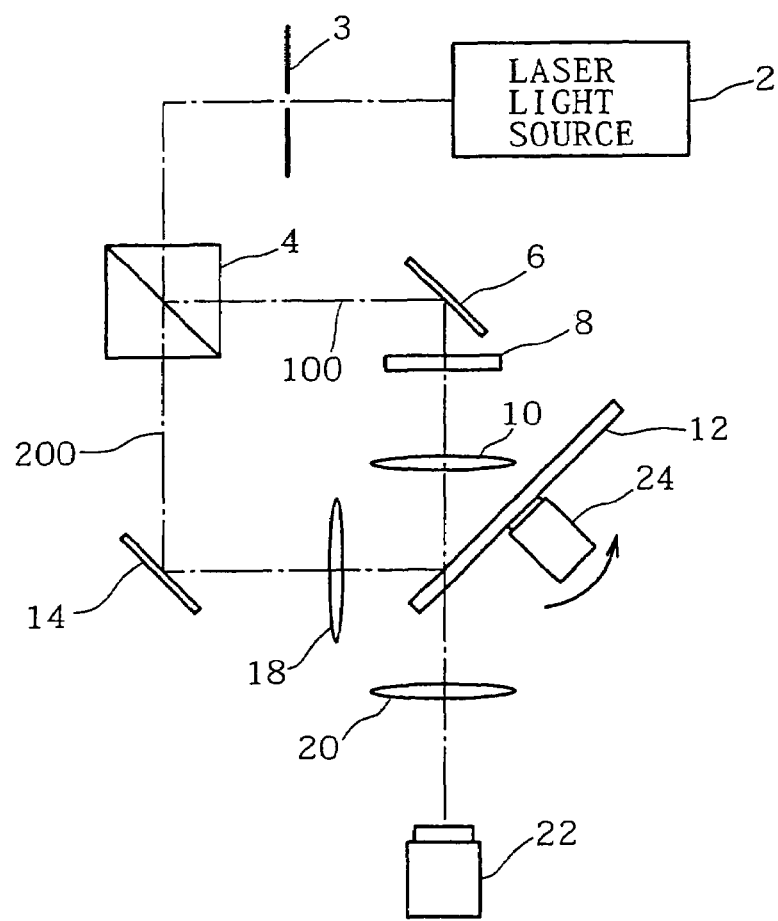
FIG. 5 is a schematic view showing an example of a configuration of a conventional hologram recording and reproduction apparatus which performs shift multiplexing hologram recording.

FIG. 4 shows a configuration of a hologram recording and reproduction apparatus according to a third embodiment of the present invention and particularly shows a reproduction system of the hologram recording and reproduction apparatus. The reproduction system of the hologram recording and reproduction apparatus of the present embodiment is generally configured such that a reflecting film is provided on a face of a hologram recording medium remote from a lens for illuminating reference light and recording light. Although the hologram recording and reproduction apparatus further includes a recording system, the recording system is same as that of the hologram recording and reproduction apparatus of the first embodiment described hereinabove with reference to FIG. 1. Therefore, the recording system is not shown in FIG. 4 and overlapping description of the same is omitted herein to avoid redundancy.

Referring to FIG. 4, the hologram recording and reproduction apparatus 90 of the present embodiment includes a laser light source 2, a beam splitter 4, a mirror 14, a randomizing phase mask 16, a lens 18, a beam splitter 26, another lens 10, a hologram recording medium 36 in the form of a disk made of a photopolymer material or the like, a detector 22 and a spindle motor 24. The hologram recording medium 36 has a reflecting film 361 on the surface thereof remote from the lens 10.

It is assumed that holograms are recorded on the hologram recording medium 36 by the recording system mentioned above. Upon reproduction, a laser beam emitted from the laser light source 2 is converted into reproduction reference light by the beam splitter 4. The reproduction reference light successively passes the mirror 14, randomizing phase mask 16, lens 18, beam splitter 26 and lens 10 and is condensed on a recording track of the hologram recording medium 36. Consequently, diffracted light (reproduction light) corresponding to interference fringes recorded on the recording track of the hologram recording medium 36 is generated. The reproduction light is reflected back by the reflecting film 361 and returns to the lens 10, whereafter it passes through the beam splitter 26 and is condensed on the detector 22, by which it is reproduced as data.

According to the hologram recording and reproduction apparatus of the present embodiment, where the hologram recording medium 36 with the reflecting film 361 is used, reproduction reference light can be condensed on the hologram recording medium 36 by the lens 10, and the reproduction light reflected back by the reflecting film 361 from the hologram recording medium 36 can be condensed on the detector 22 using the lens 10. Consequently, the hologram recording and reproduction apparatus of the present embodiment does not require the lens 20 exclusive use for condensing reproduction light on the detector 22 as in the hologram recording and reproduction apparatus of the first embodiment. Therefore, it is necessary only for the lens 10 to follow up the recording and/or reproduction position of the hologram recording medium 36, and the number of lenses required can be reduced by two from that of the conventional hologram recording and reproduction apparatus. Accordingly, the actuator can be simplified and miniaturized further than those of the hologram recording and reproduction apparatus of the first embodiment, and the degree of freedom in design is further enhanced and designing for miniaturization of an apparatus can be preformed further readily. Further, since the servo system including the actuator is simple, the production cost can be reduced and the apparatus can be produced at a further low cost.

It is to be noted that, if two lenses corresponding to the lens 30 and the lens 34 and an aperture member similar to those in the hologram recording and reproduction apparatus of the second embodiment described hereinabove with reference to FIG. 3 are interposed between the beam splitter 26 and the detector 22, then most part of the reproduction reference light reflected by the reflecting film 361 to return to the lens 10 can be intercepted. Consequently, the S/N ratio of the reproduction signal can be improved significantly similarly as in the hologram recording and reproduction apparatus of the second embodiment.

While preferred embodiments of the present invention have been described using specific terms, such description is for illustrative purposes only, and it is to be understood that changes and variations may be made without departing from the spirit or scope of the following claims.

What is claimed is:

1. A hologram recording and reproduction apparatus for recording interference fringes produced by interference of a spatially optically modulated first light beam and a second light beam in a recording area of a hologram recording medium, comprising:

a randomizing phase member for disturbing a wave front of the second light beam at random; and an optical axis coupling optical system for coupling the spatially optically modulated first light beam and the second light beam having the randomly disturbed wave front so as to have a common optical axis and propagate in the same direction, further comprising an image pickup device for receiving diffracted light, which is generated by the hologram recording medium when the second light beam having the optical axis common to the optical axis of the first light beam is illuminated solely on the hologram recording medium, to obtain a reproduction signal and a light beam removing device for removing the second light beam from the diffracted light, and further comprising an optical lens for causing the second light beam having the randomly disturbed wave front and the spatially optically modulated first light beam to be condensed in different condensation states from each other at the position of the hologram recording medium.

* * * * *